Aug. 16, 1966  C. J. NELSON ETAL  3,267,263

NAVIGATIONAL COMPUTER-DISPLAY APPARATUS

Filed Nov. 29, 1962  6 Sheets-Sheet 1

INVENTORS
CARLTON J. NELSON
DONALD N. SPANGENBERG

Henry Hausen
AGENT

INVENTORS
CARLTON J. NELSON
DONALD N. SPANGENBERG

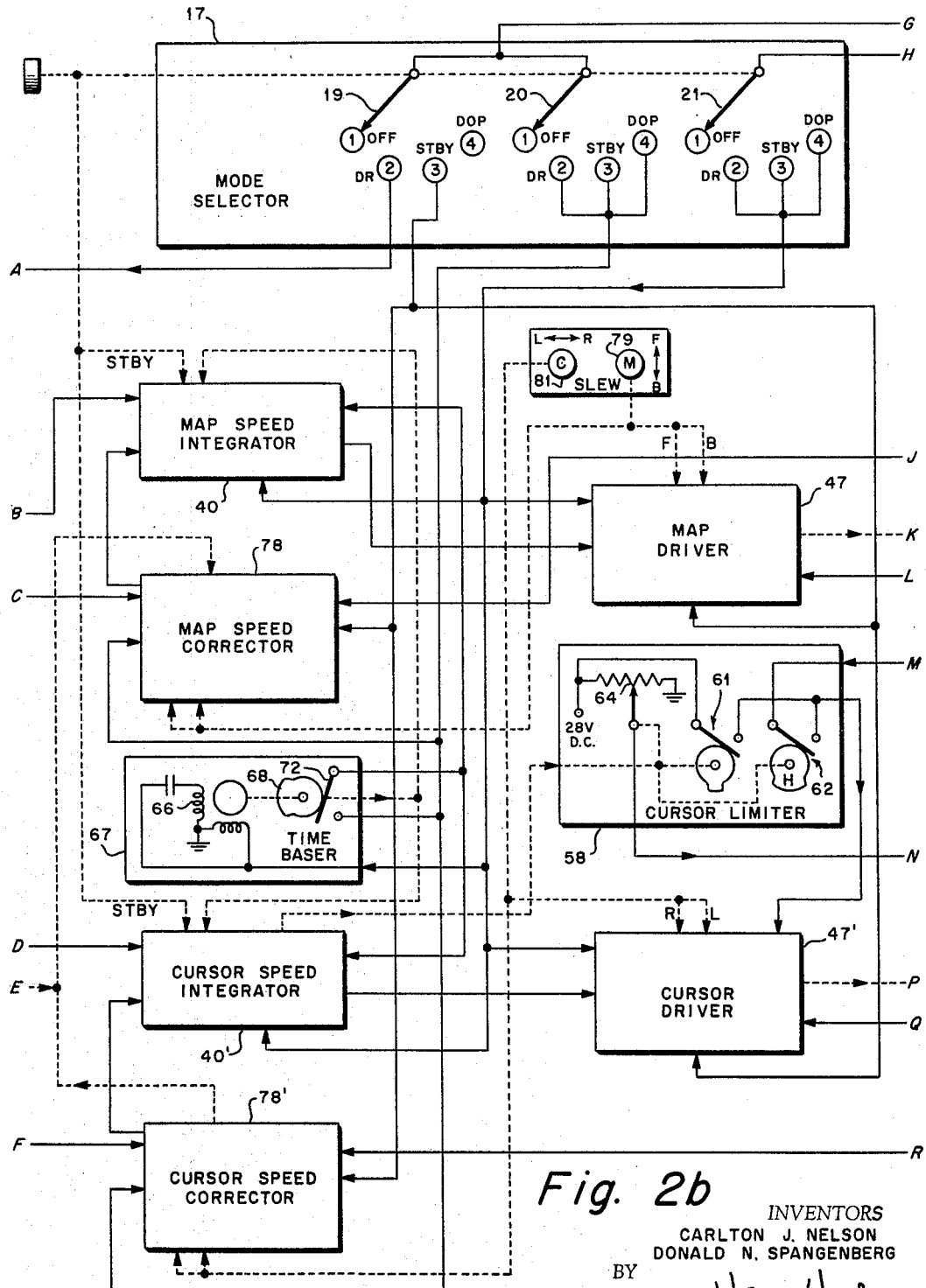

INVENTORS
CARLTON J. NELSON
DONALD N. SPANGENBERG
BY

*Henry Hansen*

AGENT

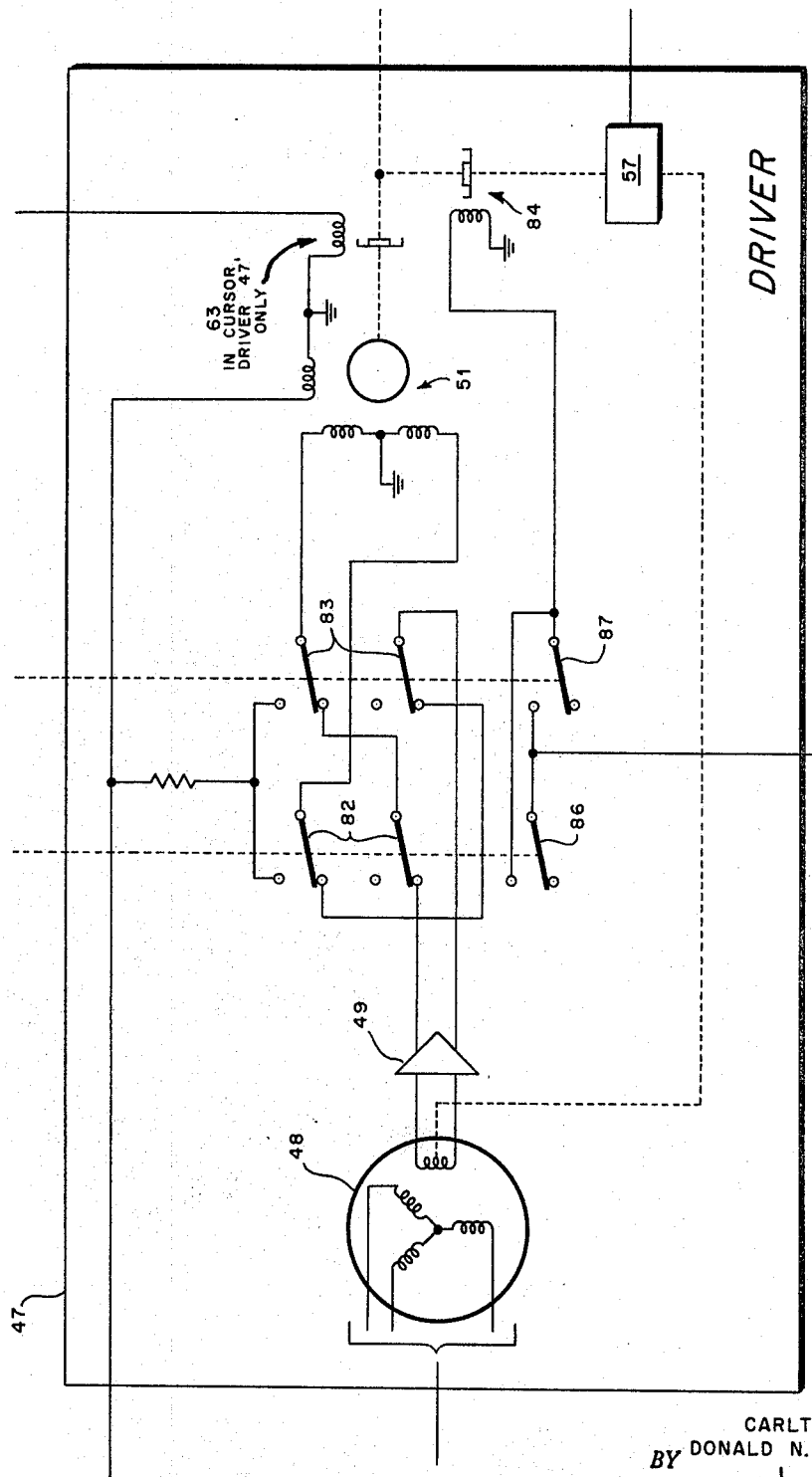

3,267,263
NAVIGATIONAL COMPUTER-DISPLAY APPARATUS
Carlton J. Nelson, Furlong, and Donald N. Spangenberg, Southampton, Pa., assignors to the United States of America as represented by the Secretary of the Navy
Filed Nov. 29, 1962, Ser. No. 241,079
6 Claims. (Cl. 235—150.27)

The invention described herein may be manufactured and used by or for the Government of the United States of America for governmental purposes without the payment of any royalties thereon or therefor.

The present invention relates to an aircraft navigation computer-display apparatus for indicating and plotting the ground track of an aircraft over a preselected mapped area; and more particularly to an aircraft navigation computer-display apparatus capable of being quickly corrected for error thereby providing accurate and instantaneous position indication for light attack aircraft.

Aircraft navigation systems combined with ground track displays have become extremely important adjuncts to military aircraft for increasing the probability of success of tactical missions such as involving loft bombing, anti-submarine warfare, aircraft early warning, and mine laying. As general navigational aids, they are particularly helpful for terrain avoidance and clearance, for radar correlation and confirmation, and for land-mark identification. Consequently, present navigation computer-display systems have advanced in the art to large and sophisticated instrumentation complexes. Consonant with the high-speed capabilities of present-day high-performance aircraft, the multiplied disciplines now required in tactical missions, the much-advanced technology in aircraft countermeasures, and the greater demands for precise execution and success probability of military missions, aircraft instrumentation has undergone many major changes in structure and operating modes. In some instances the resulting instrumentation required additional crewmen for gaining maximum effectiveness because of the already existing heavy demands expected from the pilot; and in other instances the resulting instrumentation, due to its size and weight, required large aircraft. These two requirements are logistically and conspicuously difficult to satisfy in certain military missions where small cockpit light attack airplanes are employed; for example, low-altitude loft, dive, or toss bombing missions.

As equipment design limitations, these two requirements heretofore imposed serious compromises in instrumentation such as restricting the aircraft course and maneuvers to straight and horizontal flight patterns and allowing only slight deviations therefrom, limiting the navigation input parameters measurable in the aircraft to only a few thereby preventing the pilot from choosing a particular navigation mode best suited for given flight schedules and weather conditions. For example, in the presence of electronic countermeasures it may be preferable for the pilot to transfer from a Doppler-radar speed input to a air-mass measurements used in the dead reckoning mode, the former subject to being "jammed" by counter-transmission signals.

Accuracy of the computed ground track of an airplane, of course, depends in part upon a precise measurement of pertinent navigation parameters, and upon the degree of reproducibility of the components operating in the apparatus (also known as system accuracy). Even in the most sophisticated dead reckoning DR mode navigational computers, wind and other factors contributing toward resolving the true airspeed TAS into a ground speed GS are, at best, based on weather data gathered at some distant geographical location is based on values computed in the aircraft over some experienced period of the flight.

Assuming no system inaccuracy, in the first instance, any discrepancy in plane position indication results from a lack of correlation in the wind measurements at the weather station and at the actual location of the aircraft; and in the second instance, error results from any change in wind conditions subsequent to experienced wind computations. On long missions, frequent aircraft maneuvers and changes in course and altitude imminently produce large discrepancies in the navigational computations and result in less effective or even aborted missions.

Accordingly, it is an object of the present invention to provide an improved aircraft navigational computer-display apparatus for indicating instantaneous aircraft position on a map representing a preselected flight corridor, in which the apparatus provides a continuous display of position regardless of course irregularities caused by evasive maneuvers that the pilot may take, in which position and speed correction of the display can be easily and quickly made as often as desired thereby affording a substantially continuous corrected ground track of the airplane, and in which wind and other factors affecting airplane drift may be automatically computed and used to correct the indicated plane position.

Another object of the invention is to provide a novel aircraft navigational computer-display apparatus capable of operation under either a Doppler-radar mode or a dead reckoning mode in the event of failure of one mode or conditions prohibit use of one, in which all-weather operational capabilities are provided in accordance with Instrument Flight Regulations (IFR), and in which operation under either mode enables the pilot to fly at high or low altitudes pursuant to a mission with little distraction from other flight disciplines.

Still another object of the invention is to provide a novel navigational computer-display apparatus in which an aircraft may fly beyond the boundaries of the map display and re-enter with no lapse or error in navigational computation or display, and in which plane position indication is continuously diplayed irrespective of map boundaries.

A further object of the invention is to provide an improved navigational computer-display which is particularly adaptable for use in low-level penetration missions of military aircraft, and which provides accurate and advanced navigational information essential for anticipating and identifying landmarks and starting points on a map in relation to pre-planned courses.

A still further object of the invention is to provide a relatively simple aircraft navigational computer-display apparatus which is inexpensive to manufacture, maintain and repair, and which is lightweight and compact especially for installation in close-quartered, single-seat light-attack aircraft.

Various other objects and advantages will appear from the following description of one embodiment of the invention, and the most novel features will be particularly pointed out hereinafter in connection with the appended claims.

In the drawings:

FIG. 1 represents a basic navigation vector diagram superimposed on a section of a strip map of the present invention;

FIGS. 2a, 2b, and 2c schematically represent one embodiment of a navigational computer-display apparatus of the present invention;

FIG. 4 is a schematic representation of the map driver shown in FIG. 2b;

Figure 1:
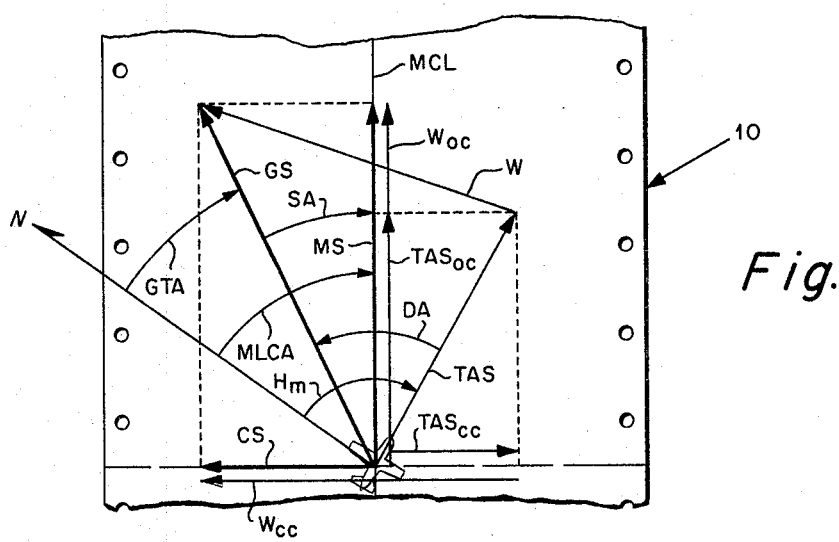

In the illustrated embodiment of the invention, the basic input parameters and their relationship to each other as they are used in the navigational computations will be best understood with reference to FIG. 1 wherein a navigational vector diagram is shown on a portion of a strip map 10. The map 10 is prepared from a plurality of standard navigational or aeronautical charts spliced end-to-end for displaying a particular flight plan or route contemplated for an aircraft mission. A continuous medial line known as a mean course line or MCL is ruled on the strip map 10 and serves as the navigational range or on-course coordinate axis. The MCL also may comprise a series of flight legs in a prescribed mission of diverse courses. The magnetic meridian N for each map portion selected is known and the angle included by the meridian N and the MCL is referred to as the mean course line angle or MCLA. For sign convention when used in the computations, angles measured clockwise from the magnetic meridian N are positive or plus.

Figure 2A:
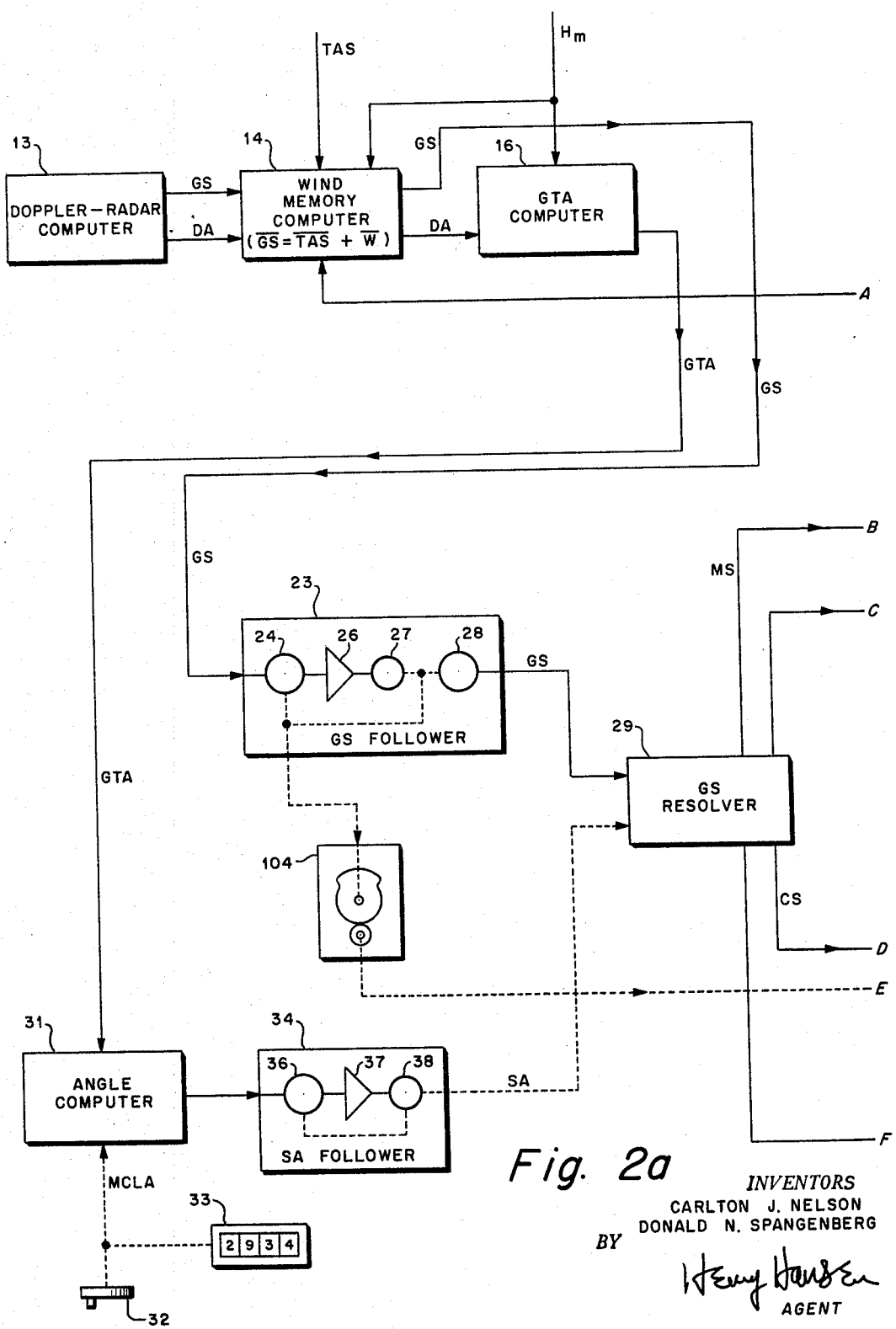
Figure 2C:
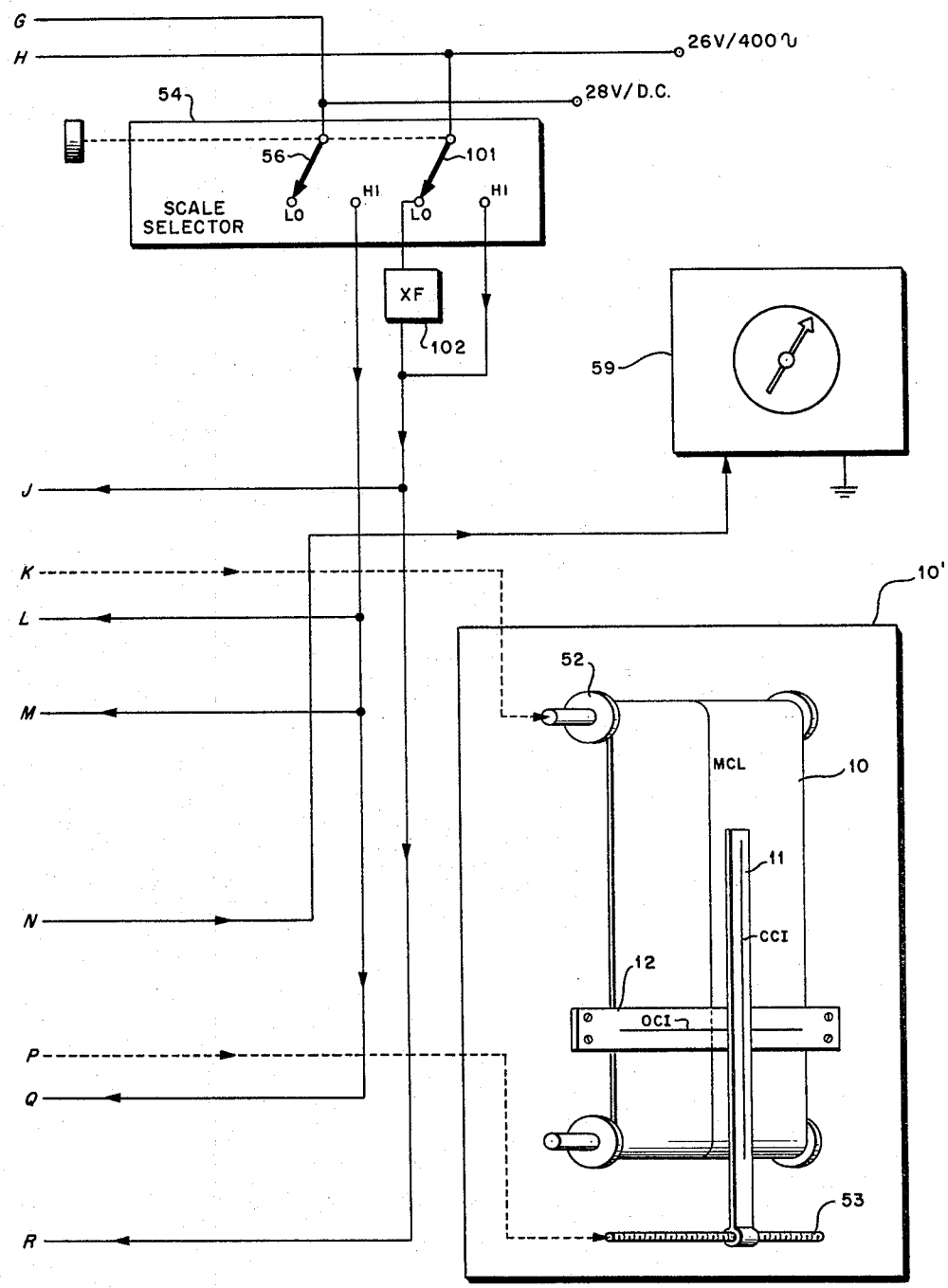

Referring briefly to FIG. 2c, it will be observed that the strip map 10 is contained in a chart transport housing 10′ which is adapted to be mounted in the aircraft for displaying the instantaneous position thereof. As will be explained in more detail hereinbelow, this position is indicated at the intersection of perpendicularly disposed index lines each respectively inscribed on a movable transparent cross-course index 11 and a fixed transparent on-course index 12. This instantaneous position of the aircraft is shown in FIG. 1, for convenience, at the MCL. The aircraft ground speed vector GS may thus be shown as forming a ground track angle GTA with the magnetic meridian N, and further defining a steering angle SA with the mean course line MCL. The true vector GS, whether derived from Doppler-radar or from dead reckoning computers, is always the vectorial sum of true airspeed TAS and wind speed W as shown in FIG. 1. The TAS vector, of course, is along the aircraft longitudinal axis and thus defines a drift angle DA with the vector GS, and further defines the magnetic heading $H_m$ of the aircraft.

In the Doppler-radar or DOP mode, the ground speed GS and drift angle DA are computed directly; but under the dead reckoning or DR mode, the ground speed GS must be computed from true airspeed TAS and wind W. In either mode, the ground speed GS is then resolved into normal components coinciding with the cross-course and on-course indexes 11 and 12 and are used to drive the map 10 at a map speed MS and the index 11 at a cursor speed CS, respectively. Mathematically, these components are expressed as follows:

$$MS = GS \cos SA \qquad (1)$$
$$CS = GS \sin SA \qquad (2)$$

Now it should be apparent that the two distinct modes of operation provide Doppler-radar (DOP) computed ground speed GS and drift angle DA; or alternatively, dead reckoning (DR) computed wind W and true airspeed TAS, as the basic input parameters for solving the map speed MS and cursor speed CS. The magnetic heading $H_m$ input and the manual input of mean course line angle MCLA, of course, are required in either computation.

In FIG. 2a, the navigational computer-display apparatus obtains electrical signals indicative of ground speed GS and drift angle DA from any well-known and conventional Doppler-radar DOP computer 13. The drift angle DA signal is connected through a wind memory computer 14 to a ground track angle GTA computer 16 wherein the drift angle DA is algebraically added to the magnetic heading $H_m$ to produce an output signal indicative of the ground track angle GTA. Under the DOP mode, the wind memory computer 14 serves both as a conduit for the GS and DA signals and as a wind W memory because it simultaneously receives true airspeed TAS and magnetic heading $H_m$ signals for continuously computing and memorizing wind W in any well-known manner. Should the DOP computer 13 fail or radio silence conditions occur, the computer 14 will continue generating a ground speed GS output computed from the instantaneous true airspeed TAS and the last-memorized value of wind W. This insures uninterrupted GS and DA output signals from the computer 14.

Transfer from Doppler-radar DOP to dead reckoning DR mode is effected by a manually-operated four-position mode selector switch, indicated generally by the numeral 17 in FIG. 2b; the four positions being identified as OFF, DR, STBY, and DOP. Transfer from the Doppler-radar DOP mode to dead reckoning DR mode of operation is accomplished by moving an armature 19 of switch 17 from the DOP position to the DR position whereby a 28 v. D.C. supply connected into the computer 14 switches functions as indicated above. Irrespective of the mode selected, the GS and GTA signals always appear at the outputs of computers 14 and 16, respectively.

The ground speed GS signal from the computer 14 is fed into a GS follower 23 at the fixed winding of a control transformer 24. The rotor winding of the transformer 24 is electrically connected to the input of a servo amplifier 26 which electrically drives a servo motor 27. The output shaft of the servo motor 27 mechanically drives the rotor of a linear transformer 28 as a function of ground speed GS and further provides follow-up positioning of the rotor of the transformer 24. The stator of the transformer 28 thereby produces an output signal from the unit 23 which connects to the rotor winding of a conventional electrical GS resolver 29.

The ground track angle GTA signal from the computer 16 is connected to an electrical input of a differential 31 where it is algebraically combined with a shaft rotation input from a manual crank 32 setting made in accordance with the mean course line angle MCLA of the particular portion of the strip map 10 being traversed during the mission. An indicator 33 provides a visual check of the MCLA setting. From FIG. 1 it can be seen that the steering angle SA is thus obtained in the differential unit 31 and is transmitted as an electrical signal into an SA follower 34 at the stator winding of a control transformer 36. The rotor winding of the transformer 36 is electrically connected to the input of a servo amplifier 37 which electrically drives a servo motor 38. The shaft output of the servo motor 38 is drivingly connected to the rotor of the GS resolver 29 and is further connected to the rotor of the transformer 36 to provide follow-up positioning thereof. The GS resolver 29 thus produces electrical signals at the outputs of its quadrature stator windings indicative of map speed MS and cursor speed CS, respectively, in the manner mathematically expressed in Equations 1 and 2 above.

Figure 3:
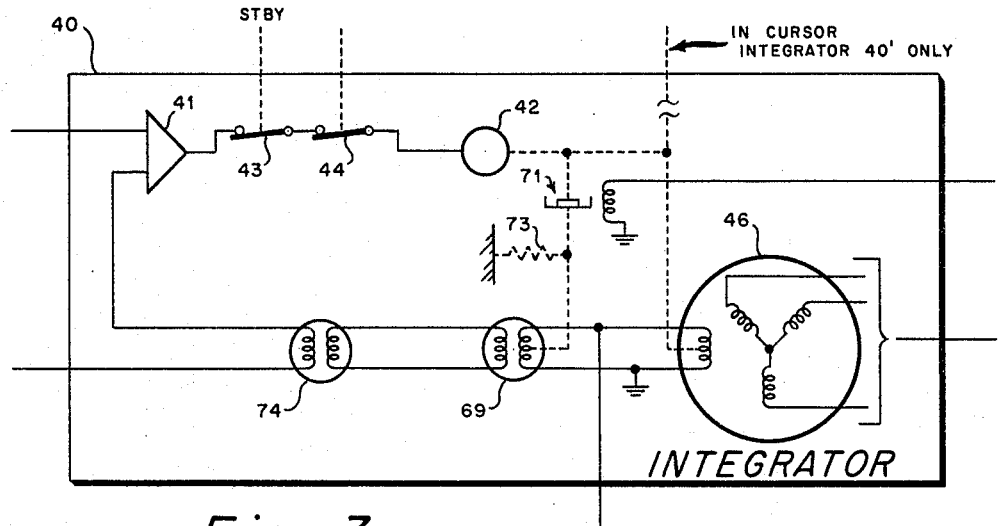
FIG. 3 is a schematic representation of the map speed integrator shown in FIG. 2b.
Figure 5:
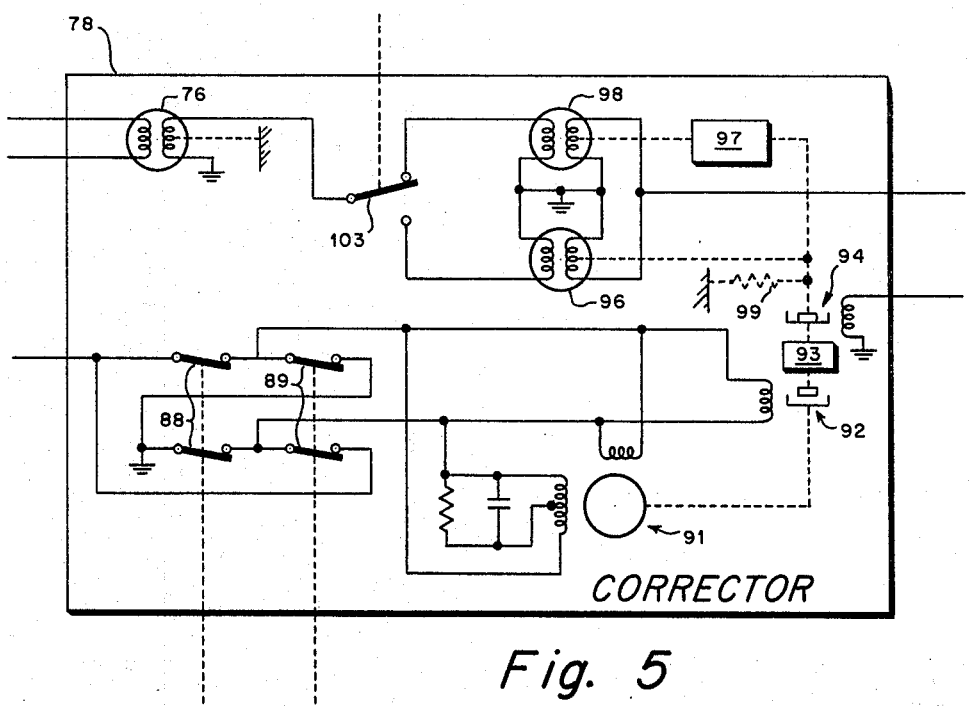
FIG. 5 is a schematic representation of the map speed corrector of FIG. 2b.

The map speed MS quadrature signal from the GS resolver 29 feeds into a map speed integrator 40 at the input of a servo amplifier 41 contained therein (FIG. 3). The amplifier output drives a servo motor 42 through a series-connected STBY switch 43 and a time cam switch 44. The output shaft of the servo motor 42 in turn positions the rotor of a transmitter 46 to provide an output from the unit 40 indicative of aircraft position. The integrator unit 40 is made non-operational when the mode selector switch 17 is in the STBY position because the switch 43 disconnects the servo motor 42 from the amplifier 41. When the mode selector switch 17 is turned to the DR or DOP positions, the switch 43 is closed and the armature 21 provides a 26 volt, 400 cycle supply to a synchronous motor 66 of a time base unit 67. A time base cam 68 driven by the motor 66 operates a time switch 72 in the unit 67 to provide thereby a constant pulse rate of 28 volts D.C. The cam 68 also provides simultaneous opening of the switch 44 in the integrator units 40 synchronous with the pulse at the switch 72. In the present invention, a feedback through a solenoid-operated clutch 71, linear transformer 69 and impedance matching transformer 74 will null-out the MS input signal at the amplifier 41 after the servo motor 42 has rotated until the feedback signal at the output of the transformer 74 is equal and opposite to the MS input signal. During feedback, therefore, the rotor of the transmitter 46 rotates an angular amount proportional to the on-course distance traveled by the aircraft during one pulse of the time base unit 67. When the cam 68 opens the switch 44 and closes switch 72, the motor 42 is deenergized, clutch 71 mechanically disengages and a flyback spring 73 returns the rotor of the transformer 69 to the starting position.

Shaft positioning of the rotor of the transmitter 46 or the electrical output signal the integrator 40 is thus characterized to proportionally drive the map 10. This output is connected to the input of a map driver 47 at the fixed windings of a control transformer (receiver) 48 (FIG. 4) the rotor output of which is electrically connected to a servo amplifier 49. A servo motor 51 driven from the amplifier 49 through series-connected slew switches 82 and 83 produces a shaft output at the map driver 47 which in turn is drivingly connected to a sprocket or roller 52 (FIG. 2c) whereby the strip map 10 is transportable beneath the on-course index 12 at a map speed MS proportional to the on-course component of the ground speed GS.

The cursor speed CS at the output of the other quadrature winding of the resolver 29 is connected to a cursor speed integrator 40' comprising elements similar to those mentioned above in connection with map speed integrator 40. A signal proportional to the cross-course distance traveled by the aircraft is thus produced which feeds into a cursor driver 47' also having structure similar to unit 47 and further having an output shaft position which is drivingly connected to a worm gear 53. The cross-course index 11 is driven laterally across the map display unit 10' by the gear 53 as a function of the cross-course component of the ground speed GS.

Some tactical missions involve relatively long flight corridors in which more detailed and definitive maps are useful during only certain portions of the pre-planned route. The strip map 10, therefore, may be spliced with map sections of different scales. A map scale selector switch 54 (FIG. 2c) is therefore provided for accommodating either of two map scales selectively without interruption of computations on map display. That is, when the armature 56 of the switch 54 is in a low scale LO position as illustrated, solenoid-operated change gears 57 remains deenergized in the map driver 47 (FIG. 4) to maintain a predetermined gear ratio in the follow-up shaft connection from the motor 51 to the rotor of the control transformer 48. When the armature 56 is turned to the high scale HI position, a 28 volt D.C. supply is connected thereby causing the change gears 57 to shift to another gear ratio consonant with any change in map scale. The cursor driver 47' is similarly affected by the contact 56 of the map scale selector switch 54.

Certain evasive maneuvers or flight conditions may require that the pilot fly the aircraft on extremely wide departures or devious excursions from the means course line MCL whereby his position is beyond the lateral boundaries of the strip map 10. A cursor limiter 58 stops the cross-course index 11 at either lateral boundary without causing a lapse or otherwise interfering with plane position computations. An extended-range cross-course dial indicator 59 is provided for continuously displaying wider departures from the MCL not possible on the map 10. This is accomplished by connecting a shaft output (as shown extending from the motor 42 in FIG. 3) from the cursor speed CS integrator 40' to a pair of cams operatively connected to switches 61 and 62 representing the LO and HI map scales, respectively. At the LO map scale, the switch 61 directly connects a 28 volt D.C. supply into the cursor drive unit 47' (FIG. 2b) at a normally closed solenoid-operated clutch 63 (FIG. 4) thus disengaging the output of the servo motor 51 from the gear 53 and from the rotor of the control transformer 48 at the low scale limits. It will be observed that this arrangement does not interrupt or otherwise interfere with the output signal from the cursor speed integrator 40; therefore cursor position indication is continuously provided at the output of the control transformer 46. At the HI map scale, the armature 56 of the map scale selector 54 provides a 28 volt D.C. supply to the clutch 63 through the switch 62 instead of 61 thereby permitting operation of the cross-course index 11 to within the limits established by the cam of switch 61. The extended-range indicator 59 continuously receives an electrical signal proportional to the lateral departure of the aircraft from MCL from a 28 volt D.C. supplied rheostat 64 in the cursor limit unit 58. The wiper of the rheostat 64 is drivingly connected to the shaft output of the cursor speed integrator 40'.

Standby operation as established when the mode selector 17 is turned to the STBY position provides power to the apparatus but there are no computing functions performed to change the last indicated plane position. The STBY mode is used when a new strip map 10 is to be inserted into the display 10', when the map 10 and the cross-course index 11 are to be translated to a starting point, or when the map 10 is to be adjusted at splices necessitated by pre-planned changes of the MCLA. Manual positioning of the map 10 and the cross-course index 11 is achieved by means of a map and cursor translation buttons 79 and 81, respectively. Of course, these buttons may be combined into a single operator if desired. The button 79 operates normally open forward F and backward B translation switches 82 and 83 (FIG. 4). With the switches 82 and 83 in the normally open, non-translating positions as shown, the output of amplifier 49 drives the servo motor 51 in response to the map position input at the control transformer 48. A constant 26 volt, 400 cycle supply from the armature 21 of the mode selector 17 appears at the normally open contacts of the switches 82 and 83 when in the STBY position. Thus, manual operation of the button 79 causes either switch 82 or 83 to connect either of electrically-opposed field windings of the servo motor 51 to the 26 volt, 400 cycle supply instead of to the output of the servo amplifier 49. The output shaft of the servo motor 51 thus rotates at a constant speed in a forward or backward direction as determined by the particular switch (82 or 83) closed. To insure that the last-computed aircraft position signal at the rotor winding of the control transformer 48 is not disturbed during translating, a normally closed solenoid-operated clutch 84 is provided in the follow-up circuit of the driver 47 to disconnect the rotor of the transformer 48 from the output of the motor 51. This clutch 84 is energized open by normally open forward and reverse switches 86 and 87 which in turn close when the button 79 is moved to the F or B position. A 28 volt D.C. supply to energize the clutch 84 is derived through the armature 20 of the mode selector 17 when in either the DR, STBY, or DOP position. In a manner similar to the above-described structure and operation for map translating, the button 81 operates right R and left L switches in the cursor drive unit 47' thus providing manual positioning of the cross-course index 11 across the map 10.

As so far described, several sources of error intrinsic to the Doppler-radar and dead reckoning navigation computer-display apparatus can be expected. The more significant of these results from equipment inaccuracies and, when operating on the dead reckoning DR mode, wind computations or estimates, and they will appear as on-course and cross-course displacements of the indices 11 and 12 from the true geographical position of the aircraft. In a manner now to be described, all errors will be combined and considered as one pseudo-wind error which will be automatically computed and compensated for to provide an accurate instantaneous aircraft position indication throughout a flight mission.

By way of a brief introduction, it may be stated that both position accuracy and speed synchronization, or so-called rate correction, of the strip map 10 and cross-course index 11 are accomplished through a check-point system in which the pilot selects any landmark recognizable from the air and whose position also appears on the map display. At the instant the pilot flies directly over the landmark, or so-called check-point, he translates the map 10 backward or forward and the cross-course index 11 right or left until the inscribed lines on the cross-course and on-course indices 11 and 12 intersect exactly over the corresponding map position on the map 10. In addition to taking out accumulated position error, this translating also introduces a speed correction at the input to the map speed and cursor speed integrators 40 and 40' to produce thereby a map speed MS and cursor speed CS more nearly proportional to the true on-course and cross-course components of the ground speed GS of the aircraft.

The parameters and computations involved for a precise determination of the rate correction necessary for speed synchronization (even for ideal flight conditions including only one type of aircraft, constant velocities, constant altitude and straight and horizontal course) would require extremely complex and expensive mechanizations. Actual or real flight conditions involve many more variations of these and other conditions rendering a theoretical solution for rate correction quite impractical of solution with known aircraft instrumentation. The present invention realizes a considerably less sophisticated mechanization of rate correction which is capable of very nearly achieving the theoretical result. The present invention is based on what may be regarded as a statistical analysis wherein certain limits of probability of accurate ground tracking are arbitrarily established. These limits may, for example, be based on the importance or risk associated with a particular aircraft mission. This analysis will be further explained by reference to a particular example; however, it should be understood that the scope of the invention is not limited to this example except to the extent set forth in the appended claims.

Figure 6:
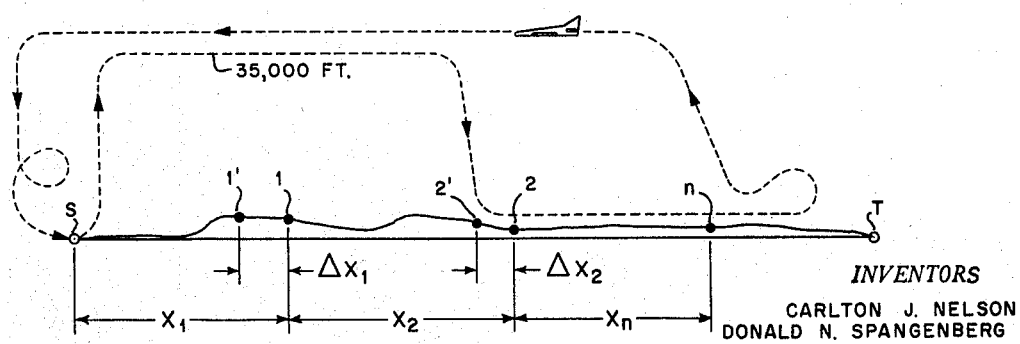
FIG. 6 is a flight profile of a typical aircraft mission.

FIG. 6 represents a typical flight profile for a light attack aircraft on a loft-bombing mission. The aircraft begins the mission from a starting point S on the ground or from the deck of an aircraft carrier having a known geographical position or navigational fix. The aircraft climbs to an altitude of about 35,000 feet taking a heading in the general direction of a target T at an average airspeed between 300 and 400 knots, with a wind about 150 knots. With about 100 miles to go to the target T, the aircraft descends to an altiude of about 100 feet to initiate a run-in maneuver between 500 and 600 knots at a wind ranging around 50 knots. At a predetermined distance before the target T the aircraft begins to pull-up and lofts a bomb during this latter maneuver. The aircraft then may return to the starting point S. Landmarks or check-points 1, 2 and n are shown along the flight corridor at spaced intervals which are used by the pilot for map position and rate correction of the navigation computer-display apparatus. The number of check points n existing for a particular aircraft mission would depend upon the distance traveled and the accuracy demanded of the computer-display apparatus at some critical position along the flight path, such as near the pull-up zone in the loft bombing mission.

Figure 7:
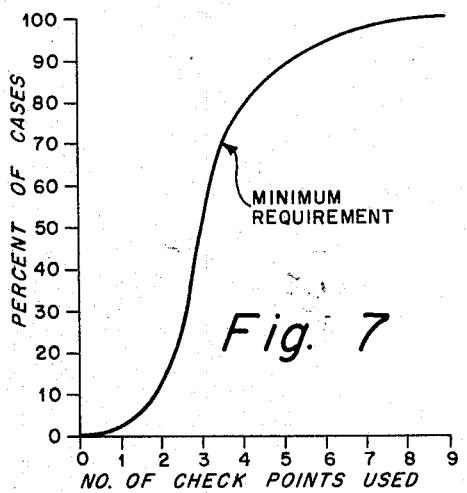
FIG. 7 is a graphical representation of an operating characteristic of the invention for a preselected acceptable accuracy level for the mission shown in FIG. 6.

FIG. 7 graphically correlates the number of check points for a mission with limits of probability for an allowable error that will insure the desired success of the above-described loft-bombing mission. In other words, this graph represents the arbitrary minimum requirements of accuracy allowable in the navigation computer-display apparatus which will justify its use in a tactical mission. The allowable error established for this mission was that the rate error be reduced to at most 1% of the initial rate, i.e. the final error difference between the true ground speed and the indicated speed must not be more than 1% of the initial difference thereof. Reading the graph of FIG. 7 in the example, it will be observed that two check points afford a probability that only 10% of the loft-bombing missions will have tracking accuracy of less than 1%; and that four or more check points insure a probability that 80% of the missions will be tracked with less than 1% error. With criteria as shown in FIG. 7, it will now be shown that a small number of certain parameters can be used which very nearly approaches the theoretical solution and further lend themselves to a simplified mechanization of computations.

Referring again to vector diagram in FIG. 1, it will be observed that W$oc$, the on-course component of wind W, and TAS$oc$, the on-course component of true airspeed TAS, yield map speed MS which is theoretically proportional to the on-course component of ground speed GS. Due to the wind errors and equipment inaccuracies mentioned earlier, the map speed MS will vary slightly from the proportionality and require correction. This may be best shown in connection with FIG. 6 wherein the map speed MS at the starting point S is too slow or "undercorrected." Thus, while the aircraft has traveled $X_1$ distance to the first landmark or check point 1, the map has been transported forward merely to a position indicated by the index 12 at 1'; the accumulated distance error being identified as $\Delta X_1$. To remove this error, the pilot must manually slew the map further forward until the indicated position 1' aligns with the check point position 1. In addition to removing the accumulative distance error, a rate correction of the map speed MS is simultaneously computed and added to the initial map speed so that the same accumulated distance error will not be repeated during the next subsequent tracking period. Assuming the MS rate correction at check point 1 was conservative, and the aircraft continues a distance $X_2$ to the second landmark or check point 2, the map 10 merely advances to an indicated position 2'. The pilot must again slew the map 10 a distance $X_2$ to the check point 2 again introducing another MS rate correction. In view of the previous correction at check point 1, the accumulated distance error $\Delta X_2$ will be less than $\Delta X_1$. This procedure can be continued for as many check points n as may be available during a flight mission, each time further diminishing the accumulated distance error $\Delta X_n$. A better perspective of the graph (FIG. 7) is now presented. If only three check points are possible between the starting point S and the target T, it has been deemed probable that 99% of the initial MS rate error will be removed in 50% of the missions. Identical procedures are followed for cursor speed CS rate errors, and therefore will not be discussed in further detail.

Mechanization of map speed and cursor corrections as employed in the present invention is best understood from a preliminary mathematical analysis of rate correction of one, i.e. map speed correction. Subscripts denoting these terms as on-course components have been omitted merely for convenience.

From FIG. 6, it is apparent that $$E_n = MS - GS \tag{3}$$

where $E_n$ = may speed error after any check point $n$,
$MS$ = map speed after check point $n$, and
$GS$ = true ground speed from starting point S to check point $n$.

From FIG. 6, it is also apparent that the map speed MS after check point $n$ is the summation of all of the intermediate map speed corrections, that is $$MS = Vo + \sum_{n=1}^{n=i} \Delta V_n \tag{4}$$

where $V_o$ = map speed existing in the system at starting point S,
$V_n$ = map speed correction inserted at any check point, and
$i$ = the final check point Combining Equations 3 and 4, the map speed error $E_n$ after check point $n$ $$E_n = V_o + \sum_{n=1}^{n=i} \Delta V_n - GS \qquad (5)$$

The distance error accumulated between check points is obviously proportional to the map speed error $E_n$ existing between these points. In terms of map speed correction, however, the sign is negative. Thus $$\Delta V_n = -K \Delta X_n \qquad (6)$$

where $\Delta X_n$ = Accumulated distance error between check points $n$ and $(n-1)$,
$K$ = a correction factor having the units of $t^{-1}$, t being the time elapsed while the aircraft travels $X_n$ distance.

From FIG. 6, it will also be seen that $$\Delta X_n = E_{(n-1)} t_n \qquad (7)$$

where $t_n$ = time for the aircraft to move $x_n$ distance.

Combining Equations 6 and 7

$$\Delta V_n = -K E_{(n-1)} t_n \qquad (8)$$

and further combining Equations 5 and 8, $$E_n = V_0 - K \sum_{n=1}^{n=i} E_{(n-1)} t_n - GS \qquad (9)$$

The term $(V_o - GS)$ is defined as the initial map speed error $E_0$, hence, Equation 9 reduces to $$E_n = E_0 - K \sum_{n=1}^{n=i} E_{(n-1)} t_n \qquad (10)$$

By expansion and induction Equation 10 becomes $$E_n = E_0 \prod_{n=1}^{n=i} (1 - K t_n) \qquad (11)$$

Since, by definition $$t_n = \frac{X_n}{GS}$$

Equation 11 may be expressed as $$E_n = E_0 \prod_{n=1}^{n=i} \left(1 - \frac{X_n}{GS}\right) \qquad (12)$$

Figure 8:
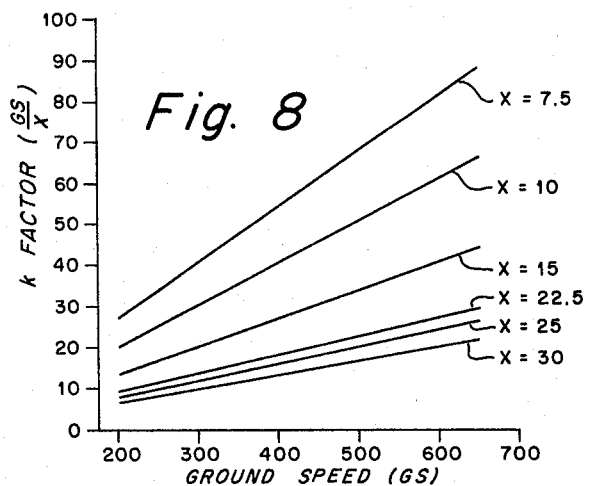
FIG. 8 is a graphical representation of computed values of factors used in the invention.

The value of K can now be calculated for a particular value of $X_n$ and GS. In most flights, $X_n$ is expected to vary between 7.5 and 30 miles, and GS between 200 and 600 knots. For the loft-bombing mission, the minimum requirement graph (FIG. 7) shows that at least three check points are required to insure at least a 50% probability of the tracking accuracy. Thus, assigning values of $E_n = 0$ and $i = 3$ to Equation 12, and different values for $X_n$ and GS within the ranges above-stated, values of K were calculated and plotted as shown in the graph of FIG. 8. These values for K, of course, are based on 100% correction of the initial error $E_0$ after three check points. For the graph of FIG. 7, it was possible to select only two mean values $K_1$ and $K_2$ which, when inserted back into Equation 12 with the independent variables, would produce a value of $E_n$ not exceeding 1% of the initial error. These two K-values satisfy two ranges of ground speed GS, and thus afford simplicity in mechanization of the rate correction computations as will now be described.

The map rate corrector 78 has an output at the stator of a linear transformer 76 which is connected in series with the map speed quadrature winding of the resolver 29 to the impedance matching transformer 74 in the map speed integrator 40. The output signal from the transformer 76 is proportional to the rate error $E_n$ as computed in accordance with Equation 12.

The computation begins when the slew button 79 is moved forward or backward to open either of slew switches 88 or 89, respectively. With either of these switches open, a 28 volt D.C. supply from the selector switch 17 drives a constant speed motor 91 in a direction depending upon which of the switches is open. Simultaneously, a normally open solenoid-operated clutch 92 closes to connect an output shaft from the motor 91 to a $K_1$ gear box 93. The 28 volt D.C. supply to the switches 88 and 89 is connected through the armature 20 of mode selector switch 17 only when it is in the DR, STBY, or DOP positions; and since the motor 91 is running at constant speed, the output shaft position is representative of $\Delta X_n$ as defined above. The output from $K_1$ gear box 93 connects to a normally closed solenoid-operated clutch 94 which opens when the mode selector switch 17 is placed in the STBY position whereby a 28 volt D.C. supply obtains through armature 19. Thus, no rate correction occurs during slewing operations in the STBY mode of operation.

The output from the clutch 94 is directly connected to the rotor of a $K_1$ linear transformer 96 and to the input of a $K_2$ gear box 97, the output of the latter being drivingly connected to the rotor of a $K_2$ linear transformer 98. The outputs of the stator windings of the transformers 96 and 98 represent the map rate error for $K_1$ and $K_2$ factors as mathematically defined in Equation 12 above. The particular output or K factor selected for rate correction at the output of the transformer 76 is determined by the K-selector armature 103 which has its common terminal connected to the fixed rotor of the transformer 76. As noted above, $K_1$ and $K_2$ are mean values for two ranges of ground speed, GS. Therefore, armature 103 is mechanically driven by a K-cam 104 which in turn is drivingly connected to the shaft output of the servo motor 27 in the GS follower 23. Thus at a predetermined speed, armature 103 switches from $K_1$ to $K_2$ operation as determined by the graph of FIG. 8.

A flyback spring 99 is connected on the output shaft of the clutch 94 so that whenever the mode selector switch 17 is in the STBY position, all map rate correction is erased and transformers 96 and 97 return to an initial zero position or start position.

Provisions compensating for changes in map scale must also be provided in the map rate corrector, and this is done by providing an appropriate voltage to the rotors of the transformers 96 and 98 by means of armature 101 in the map scale selector 44. When the armature 101 is in the LO position a transformer 102 changes a 26 volt, 400 cycle supply to a different voltage consonant with the scale change, and when the armature 101 is in the HI position, the 26 volt, 400 cycle supply is connected directly to the transformers 96 and 98 thereby providing a different scale.

Cursor speed corrector 78' operates in a manner similar to that described for map speed corrector 78 and therefore should not require further description.

A summary of operation of the navigational computer-display apparatus thus far described may be helpful to a better understanding and appreciation of the invention contained herein. The summary will be directed to the specific example of a loft-bombing mission having a flight profile as shown in FIG. 6; but it should be understood that the inventive concept extends to many varieties of aircraft missions, military and non-military, wherein precise ground tracking is the essence of the mission.

Under what might be termed preflight procedure, the strip map 10 is prepared for the flight corridor over which the aircraft flight plan has been established for an attack on the target T from a starting point S of known geographical positions. The strip map 10 will usually comprise a series of spliced navigation charts on which the mean course line MCL strikes a median line along the entire length thereof. The finished strip map 10 is then placed in a roller cartridge and inserted in the display housing 10' in the manner schematically illustrated in FIG. 2c.

The mode selector 17 is then turned from OFF to the STBY (standby) position. The strip map 10 and the cross course index 11 are translated to the starting point S by depressing the appropriate buttons 79 and 81 in the direction as required. The map scale selector 54 is also turned to the appropriate map scale position HI or LO, and the means course line angle MCLA is set on the indicator 33 to the required heading by the crank 32. Now the mode selector 17 may be turned to the DR or DOP position whereupon the system is ready for airplane take-off.

In-flight procedure begins after the airplane has become airborne but ground tracking begins at the instant the airplane begins to gain speed for take-off. When the aircraft is directly over the first check point, the pilot must look to see whether or not the indicated position at the intersection of the indices 11 and 12 coincides with the instantaneous ground position. If it does not, the pilot must correct the indicated position by operating the buttons 79 and 81 accordingly. In some instances, due to a short "on-top" time, map and cursor correction may be executed separately on successive check points when the aircraft is again "on-top" of a succeeding check point. The pilot again looks to see if the indicated position coincides with the instantaneous ground position and, accordingly, operates the buttons 79 and 81 to further correct the indicated position if necessary.

If, during a ground tracking flight, a change in the magnetic heading of the MCL is indicated on the spliced strip map 10 and mode selector 17 must be returned to the STBY position and the map translated toward the next splice line in the map wherein the indicated position will coincide with the instantaneous aircraft ground position. The new MCLA may then be inserted at the crank 32 until the desired heading appears on the indicator 33. The mode selector 17 is then turned back to the DR or DOP position as desired. Check point synchronization as described above prior to resetting the MCLA may be carried out on subsequent check points as they appear.

It should now be apparent that the navigation computer-display apparatus of the present invention provides an inexpensive instrumentation package especially adaptable for use in single-seat aircraft wherein a continuous indication of ground position in relation to a preplanned course is presented on a navigation chart regardless of course pattern irregularities resulting from evasive maneuvers or the like that the airplane may be required to perform. The apparatus also provides two separate and distinct modes of operation: the normal mode being Doppler-radar and the auxiliary mode being dead reckoning. In the event of Doppler failure or when operating under Doppler-radar silence, ground tracking may therefore be continued without interruption on the auxiliary mode.

Apparatus mechanization is kept extremely simple, particularly wherein it relates to rate synchronization and correction. This feature insures against system inaccuracies in both modes of operation; and more significantly it insures against errors in wind computations usually expected in dead reckoning navigation computations.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:
1. A navigational computer-display apparatus for use in small aircraft, comprising:
   a display housing adapted to be mounted in the cockpit of the aircraft,
   a strip map transportable along the length thereof displayed in said housing and visible to the pilot, said map including a mean course line having a known angle relative to the magnetic meridian,
   an on-course index fixed to said housing across the front of said map and normal to the length thereof for continuously indicating an instantaneous on-course position of the aircraft,
   a cross-course index normal to and movable across the length of said on-course index,
   computer means having a first pair of inputs for receiving Doppler-radar computed signals indicative of ground speed and ground track angle, a second pair of inputs for receiving air-mass signals of true airspeed and magnetic heading, and a pair of output signals of ground speed and ground track angle, said computer selectively computing said output signals from said second pair of input signals or conducting said first pair of input signals therethrough;
   mode selector means operatively connected to said computer means for selecting said computed or conducted output for indication,
   angle combining means having one input connected to the selected ground track angle output, another input connected to a crank means for manually setting the mean course line angle, and an output indicative of a steering angle,
   angle resolver means having one input connected to the selected ground speed output and any other input connected to the steering angle output of said combining means, said resolver means having one quadrature output indicative of the on-course component of the measured ground speed and the other quadrature output indicative of the cross-course component of the measured ground speed,
   map speed and cursor speed integrators connected respectively at their inputs to the on-course and cross-course resolver outputs and having outputs indicative of aircraft positions,
   map and cursor drivers connected respectively at their inputs to said integrator outputs and each having an output drivingly connected respectively to said strip map and said cross-course index for transporting each in accordance with aircraft position,
   map and cursor translation buttons operatively connected respectively to said map and cursor drivers for manually translating said map and said cross-course index irrespective of the outputs from said map and cursor speed integrators, said mode selector means further including a standby position operatively connected to said integrators for disablement thereof during translating,
   map and cursor speed correctors operatively connected respectively to said map and cursor translation buttons for producing an output indicative of the direction and amount of translation, said map corrector output signal being operatively connected between said resolver and said map speed integrator for accordingly modifying said on-course quadrature output of the measured ground speed, and said cursor speed corrector output being operatively connected between said resolver and said cursor speed integrator for accordingly modifying said cross-course quadrature output of the measured ground speed, said speed correctors each further including a plurality of factorial means for selectively modifying the corrector output to approximate selected flight conditions,
   factor selector means operative as a function of the measured ground speed to select one of said plu- rality of factorial means for modifying the corrector output, and said mode selector means operatively connected to said correctors for disablement thereof in the standby position, an extended range cross-course indicator operatively connected to an output of said cursor speed integrator for indicating aircraft position beyond the lateral boundaries of said map, cursor limit means having an input connected to an output from said cursor speed integrator and an output operatively connected to said cursor driver for disablement thereof at the lateral boundaries of said map, and map scale selector means operatively connected to said map and cursor drivers, said cursor limit means and said map and cursor speed correctors for changing the outputs thereof according to changes in map scale requirements;

whereby position and speed correction of the apparatus can be easily and quickly effectuated as often as desired and without interruption during all flight conditions.

2. A navigational computer-display apparatus for use in small aircraft, comprising:

a display housing adapted to be mounted in the cockpit of the aircraft, a strip map transportable along the length thereof displayed in said housing and visible to the pilot, said map including a mean course line having a known angle relative to the magnetic meridian, an on-course index fixed to said housing across the front of said map and normal to the length thereof for continuously indicating an instantaneous on-course position of the aircraft, a cross-course index normal to and movable across the length of said on-course index, computer means having a first pair of inputs for receiving Doppler-radar computed signals indicative of ground speed and ground track angle, and a second pair of inputs for receiving air-mass signals of true airspeed and magnetic heading, and a pair of output signals of ground speed and ground track angle, said computer selectively computing said output signals from said second pair of input signals or conducting said first pair of input signals therethrough, mode selector means operatively connected to said computer means for selecting said computed or conducted output for indication, angle combining means having one input connected to the selected ground track angle output, another input connected to a crank means for manually setting the mean course line angle, and an output indicative of a steering angle, angle resolver means having one input connected to the selected ground speed output and any other input connected to the steering angle output of said combining means, said resolver means having one quadrature output indicative of the on-course component of the measured ground speed and the other quadrature output indicative of the cross-course component of the measured ground speed, map speed and cursor speed integrators connected respectively at their inputs to the on-course and cross-course resolver outputs and having outputs indicative of aircraft positions, map and cursor drivers connected respectively at their inputs to said integrator outputs and each having an output drivingly connected respectively to said strip map and said cross-course index for transporting each in accordance with aircraft position, map and cursor translation buttons operatively connected respectively to said map and cursor drivers for manually translating said map and said cross-course index irrespective of the outputs from said map and cursor speed integrators, said mode selector means further including a standby position operatively connected to said integrators for disablement thereof during translating, map and cursor speed correctors operatively connected respectively to said map and cursor translation buttons for producing an output indicative of the direction and amount of translation, said map corrector output signal being operatively connected between said resolver and said map speed integrator for accordingly modifying said on-course quadrature output of the measured ground speed, and said cursor speed corrector output being operatively connected between said resolver and said cursor speed integrator for accordingly modifying said cross-course quadrature output of the measured ground speed, said speed correctors each further including a plurality of factorial means for selectively modifying the corrector output to approximate selected flight conditions, factor selector means operative as a function of the measured ground speed to select one of said plurality of factorial means for modifying the corrector output, and said mode selector means operatively connected to said correctors for disablement thereof in the standby position, and an extended range cross-course indicator operatively connected to an output of said cursor speed integrator for indicating aircraft position beyond the lateral boundaries of said map;

whereby position and speed correction of the apparatus can be easily and quickly effectuated as often as desired and without interruption during all flight conditions.

3. A navigational computer-display apparatus for use in small aircraft comprising:

a transportable map displayed in said aircraft, a first index fixed to said housing across the front of said map and normal to the length thereof for continuously indicating one component of an instantaneous position of the aircraft, a second index normal to and movable across the length of said first index, computing means for receiving a plurality of speed signal inputs and having outputs indicative of ground speed and ground track angle, mode selector means operatively connected to each of said computing means for selecting one of said input signals for indication of the computing means output, angle combining means having one input connected to the selected ground track angle output, another input connected to a crank means for manually setting the mean course line angle, and an output indicative of a steering angle, angle resolver means having one input connected to the selected ground speed output and any other input connected to the steering angle output of said combining means, said resolver means having quadrature outputs indicative of the normal components of the measured ground speed, integrators connected respectively at their inputs to the resolver outputs and having outputs indicative of aircraft positions, drivers connected respectively at their inputs to said integrator outputs and each having an output drivingly connected respectively to said map and said second index for transporting each in accordance with aircraft position, translation buttons operatively connected respectively to said drivers for manually translating said map and said second index irrespective of the outputs from said integrators, speed correctors operatively connected respectively to said translation buttons for producing an output indicative of the direction and amount of translation, said corrector output signals being operatively connected respectively between said resolver and said integrator for accordingly modifying said quadrature outputs of the measured ground speed, and factor selector means operative as a function of the measured ground speed to select one of a plurality of factorial means for modifying the corrector outputs.

4. A navigational computer-display apparatus for use in small aircraft comprising:

a display housing adapted to be mounted in the cockpit of the aircraft;

a map inserted in said housing and visible to the pilot and including a mean course line having a known angle relative to the magnetic meridian;

an index movable relative to said map for indicating the instantaneous ground position of the aircraft;

computing means having an output indicative of ground speed;

speed integrator means connected at its input to the output of said computing means and having an output indicative of aircraft position;

driver means connected at its input to said integrator means output and having an output drivingly connected to said map and index for moving one relative to the other in accordance with aircraft position;

translation means operatively connected to said driver for manually translating said map relative to said index irrespective of the output from said integrator means;

mode selector means including a standby position operatively connected to said integrator for disablement thereof during translating;

speed corrector means operatively connected to said translation means for producing output indicative of the direction and amount of translation, said corrector output being operatively connected between said computing means and said speed integrator for accordingly modifying said computing means output signal, and speed corrector further including a plurality of factorial means for modifying the corrector output to approximate selected flight conditions, factor selector means operative as a function of the measured ground speed to select one of said plurality of factorial means for modifying the corrector output, and said mode selector means operatively connected to said corrector for disablement thereof in the standby position;

whereby position and speed correction of the apparatus can be easily and quickly effectuated as often as desired and without interruption during all flight conditions.

5. A navigational computer-display apparatus for use in small aircraft comprising:

a display housing adapted to be mounted in the cockpit of the aircraft;

a map inserted in said housing and visible to the pilot, said map including a mean course line having a known angle relative to the magnetic meridian;

an index movable relative to said map for indicating the instantaneous ground position of the aircraft;

computing means having an output indicative of ground speed;

speed integrator means connected at its input to the output of said computing means and having an output operatively connected at its output to said map and index for moving one relative to the other in accordance with aircraft position;

translation means operatively connected to said integrator means for manually translating said map relative to said index irrespective of the output from said computing means;

speed corrector means operatively connected to said translation means for producing output indicative of the direction and amount of translation, said corrector output being operatively connected between said computing means and said speed integrator for accordingly modifying said computing means output signal, said speed corrector further including a plurality of factorial means for modifying the corrector output to approximate selected flight conditions, factor selector means operative as a function of the measured ground speed to select one of said plurality of factorial means for modifying the corrector output;

whereby position and speed correction of the apparatus can be easily and quickly effectuated as often as desired and without interruption during all flight conditions.

6. A navigational computer-display apparatus for use in small aircraft comprising:

a map supported in the aircraft;

an index movable relative to said map for indicating the instantaneous ground position of the aircraft;

computing means having an output indicative of ground speed;

speed integrator means connected at its input to the output of said computing means and having an output operatively connected at its output to said map and index for moving one relative to the other in accordance with aircraft position;

translation means operatively connected to said integrator means for manually translating said map relative to said index irrespective of the output from said computing means;

speed corrector means operatively connected to said translation means for producing output indicative of the direction and amount of translation, said corrector output being operatively connected between said computing means and said speed integrator for accordingly modifying said computing means output signal, said speed corrector further including a plurality of factorial means for modifying the corrector output to approximate selected flight conditions;

whereby position and speed correction of the apparatus can be easily and quickly effectuated as often as desired and without interruption during all flight conditions.

References Cited by the Examiner
UNITED STATES PATENTS

| | | | |
|---|---|---|---|
| 3,026,038 | 3/1962 | Ederer | 235—150.27 |
| 3,114,912 | 12/1963 | Tooley | 235—150.27 |
| 3,159,741 | 12/1964 | Dahlin | 235—183 |

MALCOLM A. MORRISON, *Primary Examiner.*

K. W. DOBYNS, *Assistant Examiner.*